United States Patent [19]
Tanaka

[11] Patent Number: 5,122,886
[45] Date of Patent: Jun. 16, 1992

[54] SELECTIVE INFORMATION PLAYBACK FROM RECORDING MEDIUM BASED ON USER INPUT CONTENT CODES

[75] Inventor: Hideo Tanaka, Saitama, Japan

[73] Assignee: Pioneer Electronic Corporation, Tokyo, Japan

[21] Appl. No.: 493,333

[22] Filed: Mar. 14, 1990

[30] Foreign Application Priority Data

Jun. 19, 1989 [JP] Japan .................. 1-156204
Jun. 19, 1989 [JP] Japan .................. 1-156205

[51] Int. Cl.⁵ .......................................... H04N 5/76
[52] U.S. Cl. .................................. 358/335; 358/342; 369/32; 369/47; 360/72.1
[58] Field of Search .................. 358/335, 342; 369/32, 369/47, 48, 30; 360/72.1, 72.2

[56] References Cited

U.S. PATENT DOCUMENTS 4,843,484  6/1989  Kanamaru et al. ............ 369/54 X

Primary Examiner—Robert L. Richardson
Attorney, Agent, or Firm—Fleit, Jacobson, Cohn, Price, Holman & Stern

[57] ABSTRACT

An information recording medium adapted to record or store therein a set of combination information of time-base-correspondent index signals such as frame numbers and corresponding content codes representing contents of an information signal and an apparatus for playing such a recording medium responsive to a playing command including specification of a content code for playing only the portion of the recording medium corresponding to the specified content code.

9 Claims, 5 Drawing Sheets

Fig. 3

| FN<br>ID(i) | FN(1) | FN(2) | | FN(i) | FN(j) | | FN(N-2) | FN(N-1) | FN(N) |
|---|---|---|---|---|---|---|---|---|---|
| ID(1) | ST |  |  | SP |  |  |  |  |  |
| ID(2) |  |  |  |  | ST |  | SP |  |  |
| ID(3) |  |  |  | ST |  |  |  | SP |  |
| ID(4) |  | ST |  | SP |  |  |  |  |  |

ID(1) : SCENE OF TEAM A AT BAT

ID(2) : SCENE OF TEAM B AT BAT

ID(3) : SCENE OF A HOME RUN HIT

ID(4) : SCENE OF AN ERROR MADE

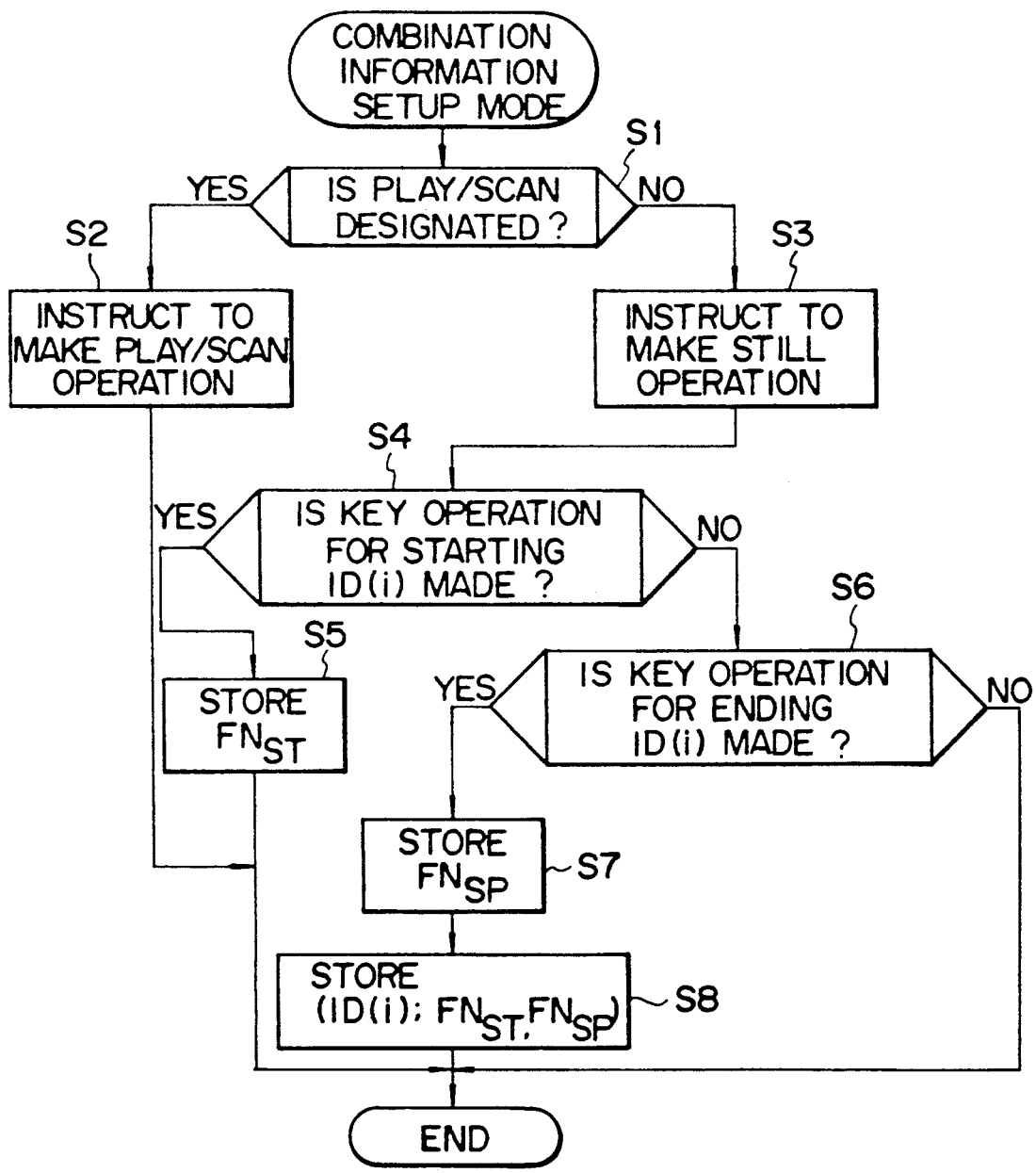

SELECTIVE INFORMATION PLAYBACK FROM RECORDING MEDIUM BASED ON USER INPUT CONTENT CODES

BACKGROUND OF THE INVENTION

1. Field of the Invention

The present invention relates to an apparatus for playing a recording medium with a composite information signal recorded therein, the signal including an information signal such as a video signal and a digital audio signal and identification signals such as frame numbers and time codes indicating positions of portions of the information signal with respect to.

2. Description of the Related Art

In a video disk player (hereinafter to be briefly referred to as VDP) or a video tape recorder (hereinafter to be briefly referred to as VTR), it is sometimes required that only a portion of an information signal desired by the operator be played. To achieve this, so-called search operation is practiced by specifying an identification signal (hereinafter to be referred to as time-based index signal"), such as the so-called frame numbers respectively indicating the positions of those frames of the composite video signal.

Generally, however, what remains in the operator's memory is not frame numbers but a scene of the video signal. Hence, it is not easy to have a desired scene reproduced by making use of the frame numbers.

The same thing is true of such a recording medium as a CD in which a composite information signal composed of a digital audio signal and time codes is recorded.

SUMMARY OF THE INVENTION

Accordingly, an object of the present invention is to provide a composite information signal recording medium and an apparatus for playing the same which will facilitate the search play operation.

The composite information signal recording medium according to the present invention stores in advance a set of combination information indicating the relationship between each time-based index code and content code in addition to an information signal and a time-based index code for the signal. The apparatus for playing such a recording medium derives the combination information from the recording medium and, based on the derived combination information, extracts the time-based index code corresponding to a specified content code therefrom, and thereupon, reproduces the portion of the information signal corresponding to the extracted time-based index code.

BRIEF DESCRIPTION OF THE DRAWINGS

FIG. 2, FIG. 4, and FIG. 5 are flow charts showing operating modes of the apparatus for playing recording medium of FIG. 1; and FIG. 3 is a table showing an example of combination information established according to the operating modes shown in FIG. 2 and FIG. 5

DETAILED DESCRIPTION OF PREFERRED EMBODIMENTS

An embodiment of the present invention will be described below with reference to the accompanying drawings.

Figure 1:
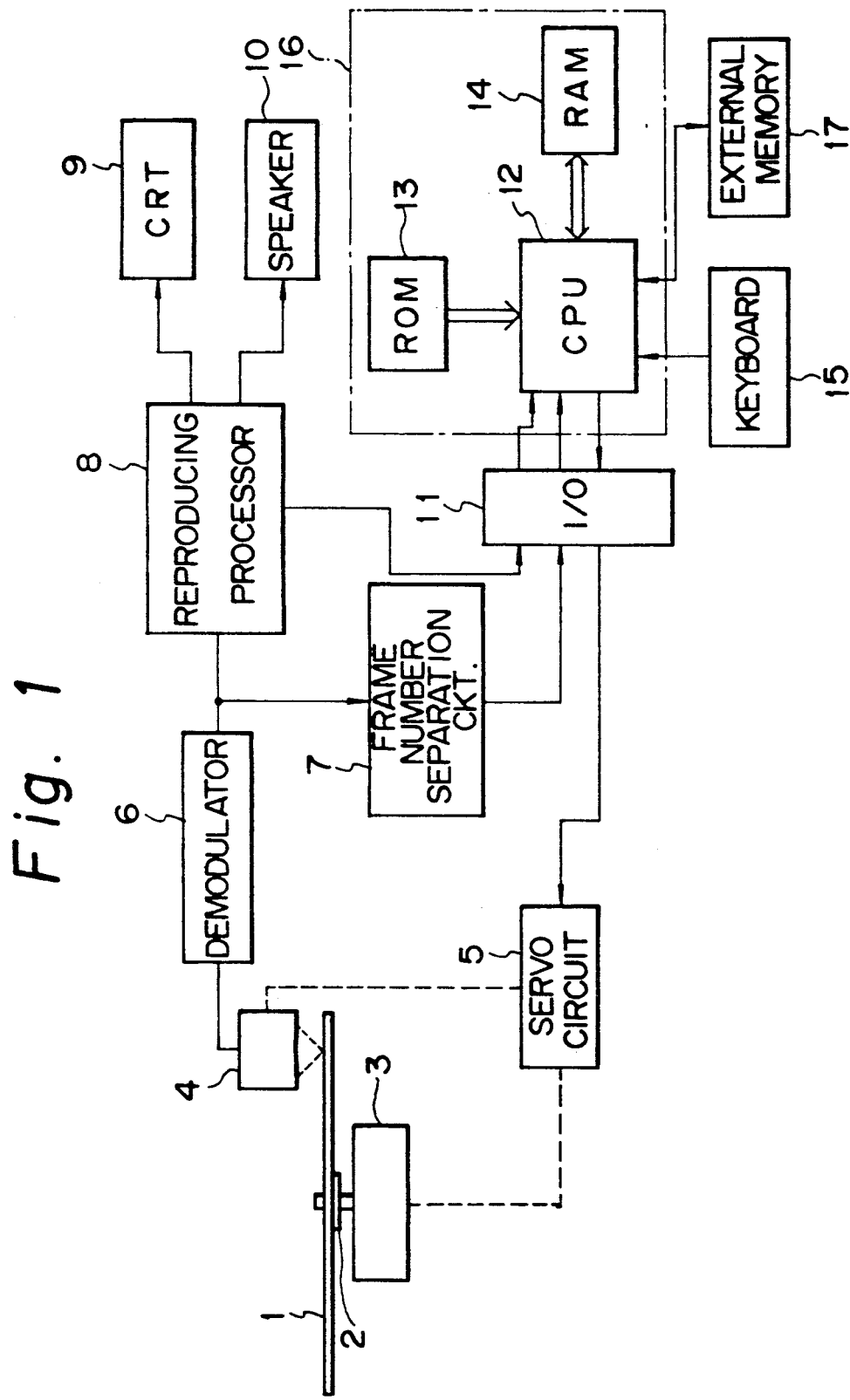
FIG. 1 is a block diagram showing an apparatus for playing recording medium according to the present invention.

In a recording medium playing apparatus according to the present invention shown in FIG. 1, a video disk 1 as the recording medium is mounted on a turntable 2 and, while it is driven to rotate by a spindle motor 3, an information detecting point of a pickup 4 is aimed at a target track on the video disk, and thereby, a recorded information signal is read out as a so-called RF signal from the target track servo control of the pickup 4 relative to the disk 1 and the number of revolutions of the spindle motor 3 is performed by a servo circuit 5. The turn table 2, spindle motor 3, pickup 4, and servo circuit 5 together constitute a playing means.

The read signal obtained from the playing means is demodulated by a demodulator 6 into a composite video signal. The obtained composite video signal is supplied to a frame number separation circuit 7 so that frame numbers are separated and extracted therefrom. The composite video signal is also supplied to a reproducing processor 8, which, after separating a horizontal and a vertical sync signal from the signal, performs such processes as to separate the information signal into the luminance signal and the chrominance signal. The reproducing processor 8 reproduces not only the video information but also an audio signal on an audio carrier, that is, while it establishes a monitor screen by driving a CRT 9 with the video signal, it reproduces the audio signal by driving a speaker 10 with the audio signal. The reproducing processor 8 further separates and extracts a code signal, such as the so-called Philips code, inserted in the vertical blanking period of the composite video signal. The above mentioned content code is included in this code signal.

In the case where the read signal is a digital audio signal of the so-called CD format and the reproducing processor 8 is a decoder of the CD format signal, an audio signal obtained from the reproducing processor 8 based on a main code is supplied to the speaker 10 and a subcode is separated and extracted.

Since the methods for recording and extracting the Philips code and the subcode are well known, they will not be described here in detail.

The content code can be inserted in the user area of the Philips code or the subcode.

Meanwhile, the frame number signal separated and extracted by the frame number separation circuit 7 and the Philips code or subcode separated and extracted by the reproducing processor 8 are supplied to a central processing unit (hereinafter to be referred to as CPU) 12 of a microcomputer through an input/output interface 11. The CPU 12, operating in association with a ROM 13 and a RAM 14, functions as a microcomputer 16 in response to commands input from a keyboard 15. When necessary, it cooperates with an external memory unit 17 such as a floppy disk drive to secure a sufficient storage capacity. The CPU further supplies a search command to the servo circuit 5 through the input/output interface circuit 11 so that the contents in the frames to be played may be reproduced, and the servo circuit 5 in turn performs the search operation by making such operation as jumping, which is known, so that the designated frames are read.

The search operation performed when the frame numbers to be played are designated is an art well known and implemented in the VDP and VTR devices on the market and, hence, the search operation when the frame numbers are designated will not be described here in detail.

While, as described above, the apparatus for playing the recording medium according to the present invention is enabled to reproduce the video which the operator desires to view without designating the frame numbers, operations performed to achieve this by the CPU 12 will be described according to FIG. 2 and other drawings subsequent thereto.

Figure 2:
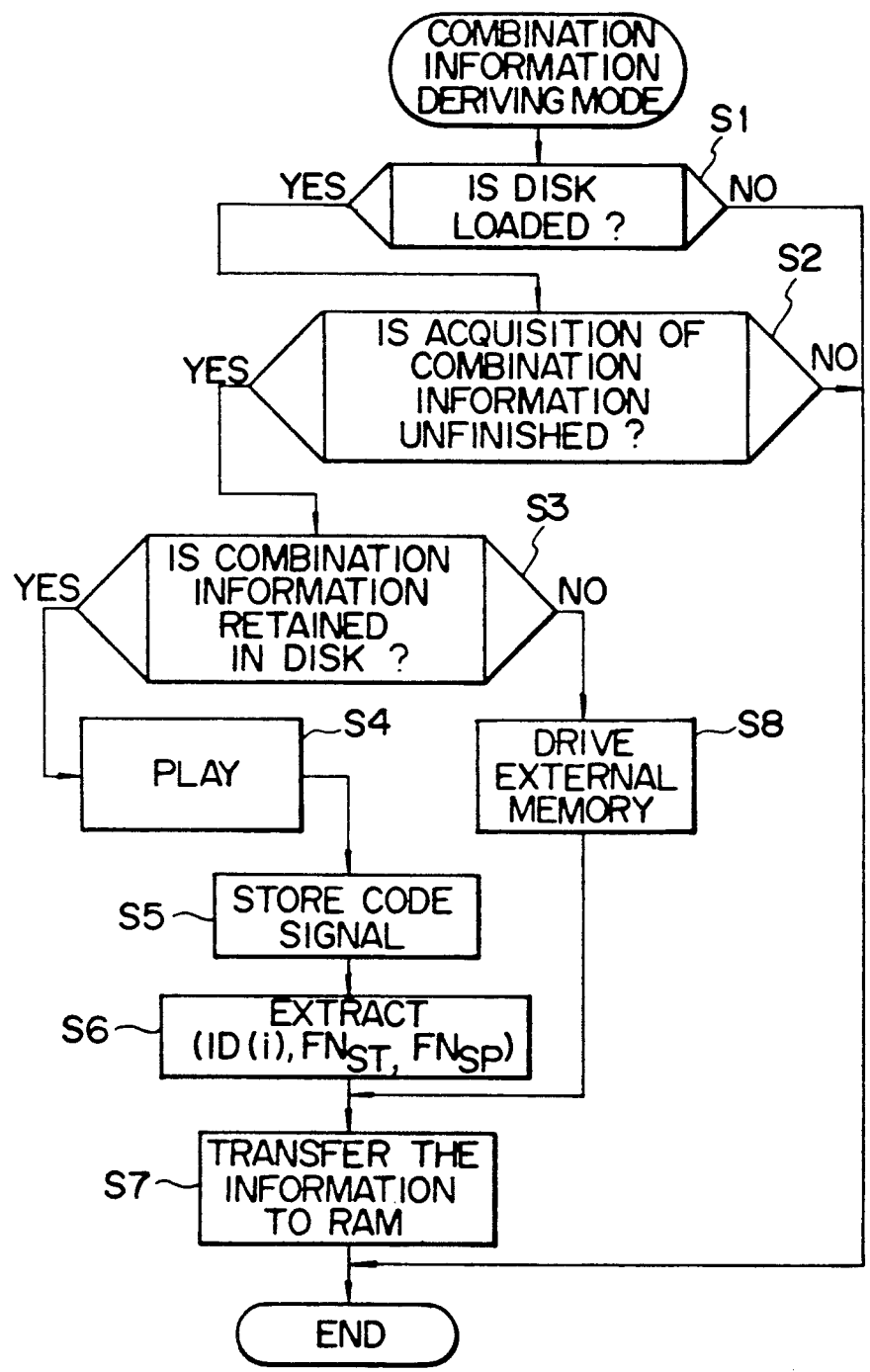

In a mode to derive the combination information shown in FIG. 2, it is first detected whether or not a disk to be played is loaded on the turntable 2 of the playing means (step S1). When the loading of the disk is detected, it is detected whether or not the combination information (ID(i); $FN_{ST}$, $FN_{SP}$) has already been derived from the disk (step S2). Here, ID(i) represents one of the prescribed content codes ID(1) to ID(n) (n: natural numbers), and $FN_{ST}$ and $FN_{SP}$ represent the head frame number and the tail frame number of the domain of the information signal corresponding to the ID(i). The set of combination information may be previously recorded on the disk in various forms. For example, in the case of a video disk, it can be recorded as a code signal such as the so-called Philips code during the blanking period, and in the case of a CD, it can be inserted in the subcode signal. Also, it is possible to record the same in advance within a predetermined region such as the innermost circumferential portion of the disk. Further, it is possible to have the combination information previously stored in a floppy disk in association with the disk and to effect loading of the floppy disk as an external memory 17 simultaneously with the disk loading.

In any case, if deviation of the combination information from the loaded disk has already been finished, the present combination information deriving mode is completed. However, if it is found that deviation of the combination information has not been finished at the step S2, then, it is determined whether or not the disk itself retains the combination information (step S3). In this regard, the information indicating that the disk retains the combination information can be previously input to the CPU 12 from the keyboard 15 or such an identification signal can be previously recorded in the disk in the form of such information as a TOC (Table of Contents).

When it is found that the combination information is recorded in the disk, the CPU 12 instructs the placing means to do a playing operation (step S4). Thereupon, the code signal extracted and supplied by the reproducing processor 8 is once stored into the RAM 14 (step S5). The code signal thus stored in the RAM 14 is decoded by arranging it according to a predetermined format, whereby the combination information (ID(i); $FN_{ST}$, $FN_{SP}$) is extracted (step S6). The decoding is the operation reverse of the coding operation of the code signal such as the subcode or the Philips code, and since such coding and decoding operations are well known, they will not be described here in detail. The thus obtained combination information is transferred to the RAM 14 and stored therein (step S7).

On the other hand, when the disk does not store the combination information, an external memory unit such as a floppy disk drive operating in association with the RAM 14 is driven (step S8), and the combination information obtained from the information in the memory is supplied to the RAM 14 (step S8).

FIG. 3 is a table showing an example of the combination information obtained in the above described combination information deriving mode, in which ID(1) is a content code indicating a scene in which the team A was at bat, ID(2) is that in which the team B was at bat, ID(3) is that in which a home run is hit, and ID(4) is that in which an error was made, each being formed of suitable numbers of bits.

The contents of ID(1)–ID(n) can be written in the notation columns on the jacket of the disk. Also, these can be recorded in a specific region of the disk as picture information or as graphics information using the subcode, which information is displayed on the CRT at the beginning of a content-code-specified playing mode. Referring to the table, the ID(1) has frame number FN(1) as the starting frame and frame number FN(i) as the final frame, ID(2) has frame number FN(j) as the starting frame and frame number FN (N-2) as the final frame, where N represents the maximum number of the frames of the information signal recorded in the recording medium and i and j are each one of numbers 1 to N.

The starting frame of the ID(3) is FN(i) and the final frame is frame number FN(N-1). The starting frame and final frame of the ID(4) are frame numbers FN(2) and FN(i).

What should be noted here is that a pair of frames $FN_{ST}$ and $FN_{SP}$ are designated for one content code.

Figure 4:
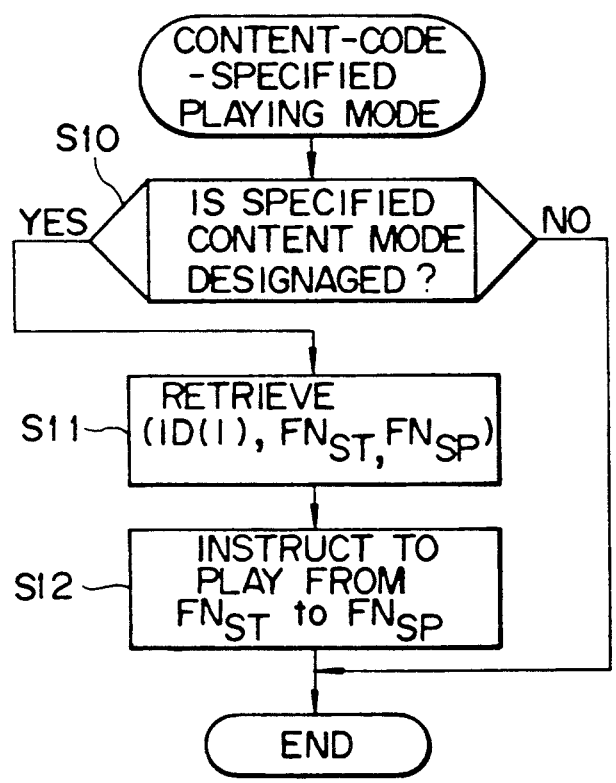

FIG. 4 shows a subroutine of a content-code-specified playing mode to execute playback according to a content code previously established and stored as described above. More particularly, when the content-code-specified playing mode is designated by means of the keyboard, the CPU 12 starts to execute this subroutine. First, at step S10, it is determined whether or not an operation for inputting the specified content code ID(i) has been made, and when the operation for inputting the ID(i) has not been made, the subroutine is ended as it is. If it is determined that the operation for inputting the ID(i) has been made, the combination information (ID(i); $FN_{ST}$, $FN_{SP}$) corresponding to ID(i) is retrieved and extracted (step S11). Then, a playing instruction to start reproduction at the obtained frame $FN_{ST}$ and end it at the frame $FN_{SP}$ is given to the playing means (step S12).

Although, in the above described embodiment, the relationship between the content code and the time-based index code was described to have previously been recorded in the recording medium, it is also possible to establish the relationship external to the playing apparatus by the user.

The operation of the apparatus for playing the recording medium according to a second embodiment of the present invention is shown in FIG. 5, in which there is prepared a combination information setup mode to be executed in advance for setting up a playing mode in accordance with the relationship between a content code and a time-based index code such as frame numbers. More particularly, the microcomputer 16 stores in advance the content codes ID(1)–ID(n) (n: natural numbers) in the ROM 13 or RAM 14 as its internal memory or in the external memory 17. These content codes are given appropriate meanings at the option of the user. In the case where the information signal recorded in the disk to be played is for example that of a baseball game between team A and team B, the same as in the first embodiment, the ID(1) may be assigned to the scene of the team A at bat, the ID(2) to the scene of the team B at bat, the ID(3) to the scene of a home run hit, and the ID(4) to the scene of an error made.

Under such conditions, when the user makes an operation for designating the combination information setup mode from the keyboard 15 with the disk, the CPU 12 executes the subroutine according to a flow chart shown in FIG. 5. That is, the CPU 12 determines whether or not a play or scan operation has been designated from the keyboard 15 (step S1), and if a play or scan operation has been made and it has not been canceled, it instructs the playing means to make the designated play or scan operation (step S2). At this point, it is possible to have an operating mode command executed such as double-speed play, multi-track jump, and fast forward, which allows the reading position to advance in the direction.

When it is found at the step S1 that there is not made any designating operation for advancing it in the direction of the time base such as play or scan, an instruction for a still operation is given to the playing means (step S3). If, then, it is found at step S4 that an operation for starting the content code ID(i) (i: one out of numbers 1 to n) has been made through the keyboard 15, then, the frame number $FN_{ST}$ of the frame which is currently still-reproduced is taken in a the $FN_{ST}$ and stored in the RAM 14 (step S5). If it is found, at the step S4, that the operation for starting the ID(i) has not been made, it is determined whether or not an operation for ending the ID(i) has been made. When it is found at the step S6 that the operation for ending the ID(i) has been made, the frame number of the frame which is currently still-reproduced is taken in and stored as the $FN_{SP}$ in the RAM 14 (step S7). Since the starting frame number $FN_{ST}$ and final frame number $FN_{SP}$ corresponding to the ID(i) have been obtained, such data are stored as combination information (ID(i); $FN_{ST}$, $FN_{SP}$) in the RAM 14 or external memory 17 (step S8).

Although, in the above described embodiment, the frame numbers of the video signal were used as the time-based index code, the time codes in the CD format can be used as such. After all, any signal will serve the purpose if it is a signal relating an information signal with respect to time. Although, cases of the VDP have been described as an example, it is apparent that the present invention is also applicable to the VTR.

As has been clarified in the foregoing, the operator of the playing apparatus is only required to specify a content code and thereafter the playing apparatus determines the portion to be played by itself and plays that portion. Since it is not required for the operator to specify frame numbers, time codes, or the like, the present invention provides a considerable convenience.

What is claimed is:

1. An apparatus for playing a recording medium storing a video information signal and time-based index codes recorded therein comprising:
   first storage means of storing in advance content codes corresponding to particular consecutive frames of said video information signal;
   second storage means for storing a combination of a content code and one or more of said time-based index codes, said time-based index codes specifying a region of said recording medium carrying said particular consecutive frames;
   retrieval means for extracting, in response to user input of a content code, time-based index codes corresponding to the specified content code; and
   reproduction means for reproducing part of said information signal within a range specified by retrieved time-based index codes.

2. A method for storing data on a recording medium to enable playback of particular segments of video content information in response to user input, the method comprising the steps of:
   storing video content information in segments on a recording medium, each segment of content information occupying unique addresses on the recording medium;
   storing time-based index codes on said recording medium for each of said segments of video content information, each time-based index code specifying he starting address and ending address of the corresponding segment of video content information; and
   storing content codes for each segment of video content information on said recording medium in association with the time-based index codes for the corresponding segment of video content information.

3. A method for storing data on a recording medium and reproducing data therefrom, to enable playback of particular segments of video content information in response to user input, the method comprising the steps of:
   storing data on said recording medium comprising the steps of:
      storing video content information in segments on a recording medium, each segment of video content information occupying unique addresses on the recording medium;
      storing time-based index codes on said recording medium for each of said segments of video content information, each time-based index code specifying the starting address and ending address of the corresponding segment of video content information; and
      storing content codes for each segment of video content information on said recording medium in association with the time-based index codes for the corresponding segment of video content information;
   providing a listing of said segments of video content information together with the corresponding content code for each segment;
   reproducing the data from said recording medium comprising the steps of:
      reading the time-based index codes and video content codes from said recording medium;
      receiving as user input a particular content code for a particular segment of video content information;
      determining the time-based index code corresponding to the particular content code input by the user;
      reading the segment of video content information which corresponds to said particular content code beginning at the appropriate starting address and ending at the appropriate ending address as defined by said particular time-based index code.

4. The method of claim 3, wherein said video content information is recorded at a high frequency and said time-based index codes and content codes are recorded on said recording medium as a combination digital signal at a low frequency.

5. The method of claim 4, wherein said combination of said time-based index codes and content codes is encoded as a code signal which is inserted in the vertical blanking period of said video content information.

6. The method of claim 4, wherein said video content information is a main code signal of a digital audio signal and said combination of said time-based index codes and content codes is encoded as a subcode of said digital audio signal.

7. The method of claim 3, and further comprising the step of storing an identification signal on said recording medium indicating whether or not the recording medium retains said combination signal.

8. A method for storing data on a recording medium and reproducing data therefrom, to enable playback of particular segments of video content information in response to user input, the method comprising the steps of:

storing video content information in segments on a recording medium, each segment of video content information occupying unique addresses on the recording medium;

storing time-based index codes in a memory device associated with said recording medium for each of said segments of video content information, each time-based index code specifying the starting address and ending address of the corresponding segment video of content information; and storing content codes for each segment of video content information in said memory device associated with said recording medium, each of said content codes being stored in said memory device in association with the time-based index codes for the corresponding segment of video content information;

providing a listing of said segments of video content information together with the corresponding content code for each segment;

reproducing the data from said recording medium comprising the steps of:

reading the time-based index codes and content codes from said memory device;

receiving as user input a particular content code for a particular segment of video content information;

determining the time-based index code corresponding to the particular content code input by the user;

reading the segment of video content information which corresponds to said particular content code beginning at the appropriate starting address and ending at the appropriate ending address as defined by said particular time-based index code.

9. An apparatus for playing a recording medium storing thereon a video information signal comprising segments consisting of consecutive video frames, content codes specifying each segment of said video information signal, and time-based index codes specifying starting and ending addresses of corresponding segments of the video information signal, the apparatus comprising:

retrieval means for extracting, in response to user input of a content code, time-based index codes corresponding to the user input content code; and reproduction means for reproducing part of said video information signal within a range specified by retrieved time-based index codes.

* * * * *